Sept. 5, 1961 A. D. FRANKENFIELD 2,998,916
TWO-DIMENSION SLIDE RULE
Filed Aug. 13, 1956 3 Sheets-Sheet 1
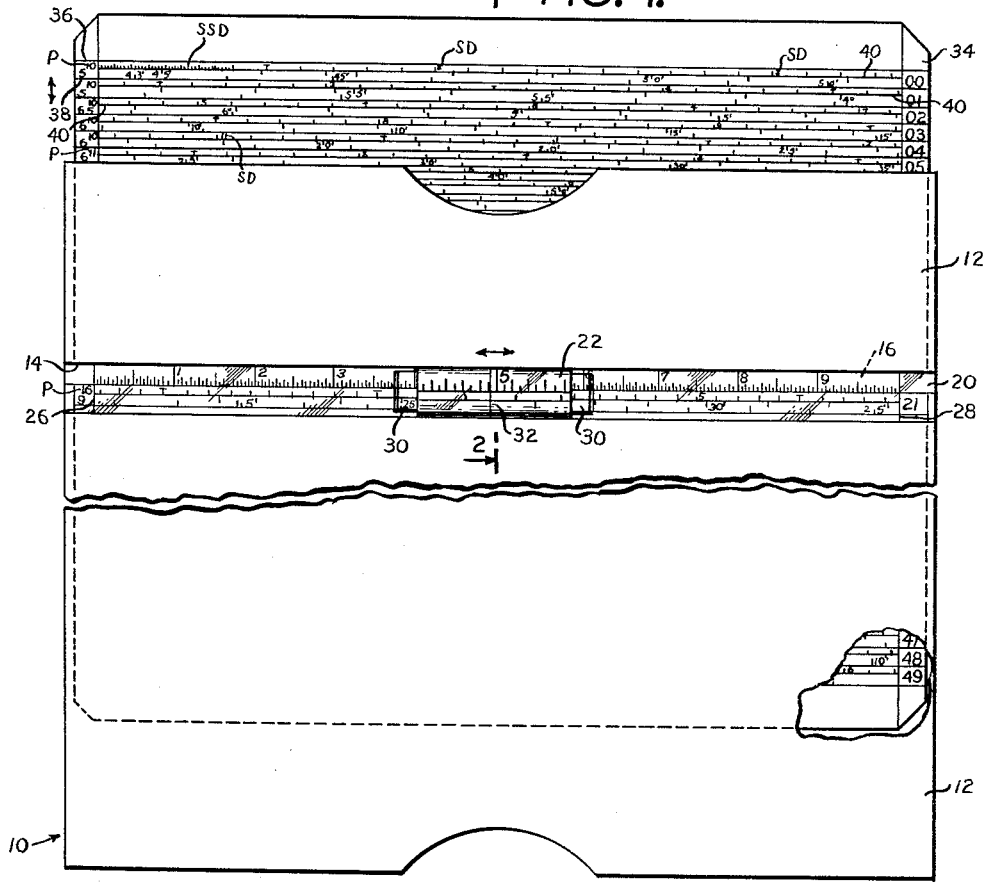
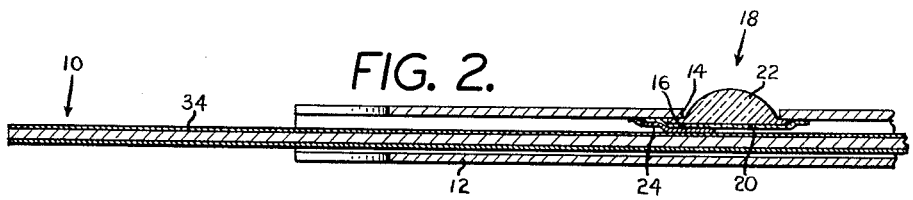
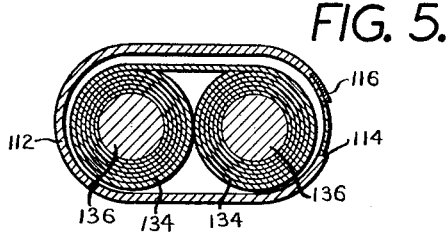
INVENTOR
ANDREW D. FRANKENFIELD.
BY Percy Freeman
ATTORNEY Sept. 5, 1961 A. D. FRANKENFIELD 2,998,916
TWO-DIMENSION SLIDE RULE
Filed Aug. 13, 1956 3 Sheets-Sheet 2
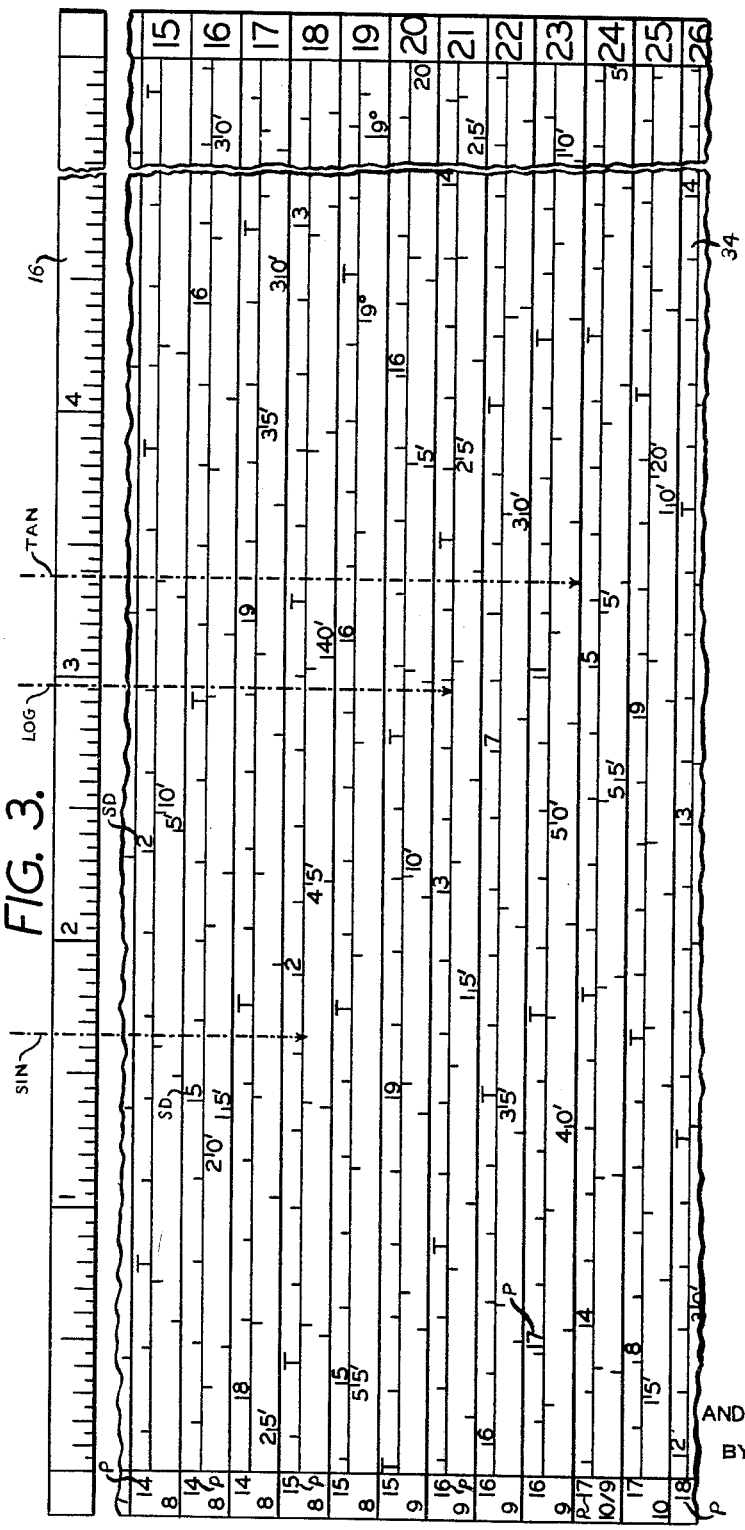
INVENTOR
ANDREW D. FRANKENFIELD.
BY Percy Freeman
ATTORNEY Sept. 5, 1961 A. D. FRANKENFIELD 2,998,916
TWO-DIMENSION SLIDE RULE
Filed Aug. 13, 1956 3 Sheets-Sheet 3

INVENTOR
ANDREW D. FRANKENFIELD.
BY
Percy Freeman
ATTORNEY.

United States Patent Office 2,998,916
Patented Sept. 5, 1961

2,998,916
TWO-DIMENSION SLIDE RULE
Andrew D. Frankenfield, 444 E. 88th St.,
New York 28, N.Y.
Filed Aug. 13, 1956, Ser. No. 603,563
1 Claim. (Cl. 235—84)

This invention relates to slide rules and more particularly to a two-dimensional slide rule.

Ordinary linear slide rules are accurate to approximately 1 part in 1000 or to one-tenth of one percent. It is the purpose and object of the present invention to provide a slide rule that is 100 times more accurate than prior devices, thereby providing an accuracy of 1 part in 100,000, or one-thousandth of one percent.

Another object of the invention is manifested in slide rules that, although they are not truly linear, they are many, many times more accurate than prior linear devices.

Features of the invention enable the reading of logarithms of numbers, trigonometric functions of angles to seconds, and the logs of these functions to five and six places with accuracy.

Another object of the invention is the provision of a slide rule that may be manufactured easily and inexpensively for pocket use, having wide appeal among engineers, students, machinists, draftsmen and others.

Other and further objects of my invention reside in the structures and arrangements hereinafter more fully described with reference to the accompanying drawings in which:

FIG. 1 is a face view of a slide rule construction in accord with the teaching of the invention.

FIG. 2 is a vertical section of FIG. 1 taken along lines 2—2.

FIG. 3 is a partial enlarged view of the scales of the slide rule.

FIG. 4 is a front perspective of a modified embodiment of the invention.

FIG. 5 is a sectional view of FIG. 4 taken along lines 5—5 thereof.

Figure 6:
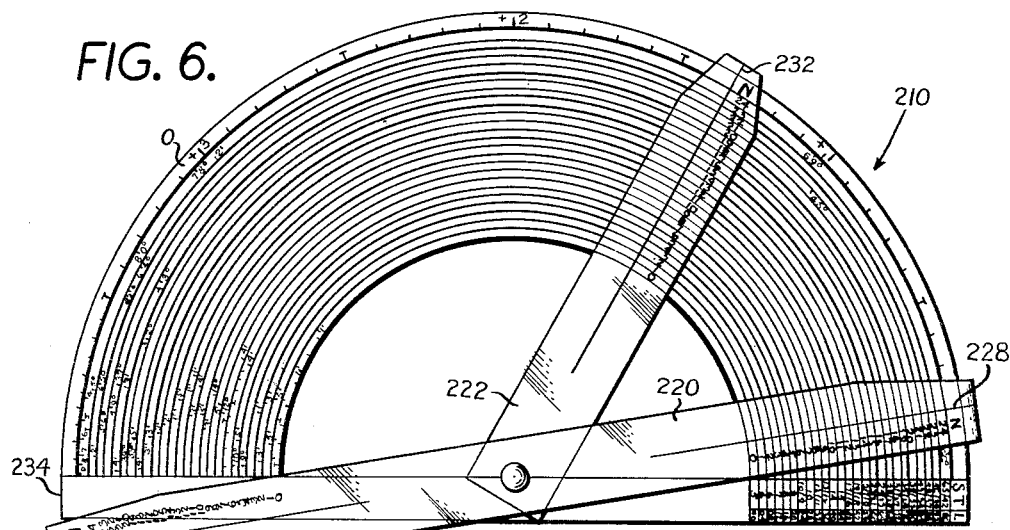
FIG. 6 is a plan view of the sine and tangent side of another embodiment of the invention.

Referring now to the embodiment shown in FIGS. 1 and 2 wherein the slide rule there shown is generally identified by the numeral 10. Slide rule 10 comprises an outer casing 12, perhaps better termed as an envelope. The envelope is provided with a window 14 extending laterally thereof for its full width. Although the window is shown in the drawing as being positioned substantially in the upper ends of the envelope, it will be clear as the description proceeds that its location relative to the upper and lower ends of the envelope may be varied if desired.

Mounted along the top edge of the window 14 is a linear scale 16. The scale 16 is divided into 10 primary divisions numbered from 1 to 9, the last vertical line in the scale not being numbered, constitutes the tenth division. Each of the ten divisions is divided still further. In the drawings it will be noted that each primary division is further broken down into 20 subdivisions; such subdivisions again may be further subdivided if desired.

An indicating means generally identified by the numeral 18 is mounted within the envelope for movement along the length of the window 14. The indicating means comprises a slide 20 (FIG. 2) and a runner 22. Slide 20 is guided for its movement beneath the window 14 by an arm 24 (FIG. 2). At each of its extreme ends slide 20 is provided with a hairline 26 and 28. The lateral space between the hairlines 26 and 28 is equal to the length of the linear scale 16.

The runner 22 that is slidably mounted on the calibrated slide 20 is thickest at its center portion to provide a magnifying effect as may be seen more clearly in FIG. 1. To facilitate smooth sliding manipulation of the runner, it may be provided with fingers 30 which are bent upwardly at its opposite ends. Positioned approximately centrally of the ends of the runner is a hairline marker 32 (FIG. 1).

Enclosed within the envelope 12 is a slidable calibrated card member 34. Card 34 serves to present at least three scales to the window 14 when it is moved longitudinally within the envelope. Referring to FIGS. 1 and 2, it will be noted that card 34 is divided into a plurality of horizontal spaces. If just one side of the card is calibrated there will be 100 of the horizontal spaces in each of which the calibrations begin in coincidence with the start of the calibrations on the linear scale 16 and end in coincidence with the last of the calibrations on the linear scale. If two sides of the card 34 are employed, the 100 spaces are divided equally therebetween 50 such spaces on each side, so that the card may be reversed within the envelope when either one side or the other is needed.

Each horizontal space is defined by a pair of horizontally extending longitudinally spaced lines 36, 38 extending the full width of the card 34 and contains three series of calibrations. The first series of calibrations extends upwardly from lines 40 drawn within the upper one-third of each space. These calibrations relate to a multiplication and division scale. The second series of calibrations relate to a sine scale and they extend downwardly from the lines 40 to occupy the middle third of each horizontal space. The third series of graduations relates to a tangent scale. They occupy the lowest third of each horizontal space and its calibrations extend upwardly from the lower line 38 into each of the spaces.

From what has been described thus far, it can be said that each horizontally spaced series of calibrations is a continuation of the next preceding one and the one following it. Together the 100 horizontal spaces define scales that are continuous and complete for their intended purposes, but for convenience they have been thus spaced longitudinally.

The multiplication-division scale is divided into 90 prime divisions P, of unequal length. The start of each prime division is numbered 10, 11, 12, to 98, 99 inclusive. Each succeeding prime division decreases in length with 10–11 having the greatest length, and 99–00 having the shortest. Each of the prime divisions P is further divided into ten secondary divisions SD which correspondingly and proportionately decrease in length. Again, the ten secondary divisions are each divided into ten subdivisions with each fifth subdivision calibration assuming the form T. Additional subdividing SSD can again be done and to show this, note the forward part of card 34 (FIG. 1).

On the lefthand edge of the card 34 in each horizontal space adjacent to the multiplication and division scale is a number that is the prime figure P for all or at least part of the prime division P calibrations in that space. At the beginning of the card the prime figure remains unchanged for several horizontal spaces, but later down the card the prime figure changes more often. Although this is not shown toward the end of the card, it changes several times while traversing one space.

Therefore, the prime numeral P in the lefthand margin of each horizontal space relates to the divisions in the scale to its right. Bringing these numerals out to the margin facilitates reading and finding numbers within the adjacent horizontal space. In reading a number on the multiplication and division scales, the two prime digits P are read first, then the secondary divisions or digits SD, leaving the final digits for estimated interpolation if subdivisions SSD are not provided.

The sine scale extends from approximately 5°45' to 90°. The tangent scale extends from approximately 5°43' to 45°. For angles smaller than sine 5°45' and tangents 5°43', another interchangeable slide card 34, having additional scales, may be provided, or if desired, a small table for these functions can be printed on the outer envelope 12. However, this will only be true of the small slide rules where the 100 horizontal spaces must be divided between both sides of the card 34. In the larger slide rules where all of the 100 horizontal spaces are on one side of the card 34, the additional scales may be added to the opposite side of the card. For tangents of angles greater than 45°, it is simply necessary to find the reciprocal of its complementary angle, and in this regard, the discussion of how to find reciprocals as set forth later in this description will be germane.

In the left marginal area of the card 34, adjacent to the sine and tangent portions of each horizontal space, are indications of the degrees for all or part of the calibrations included in such horizontal spaces. A single number included in the left-hand margin of the card beneath the prime numeral P, indicates that all angles within that horizontal space to the right of the numeral, both sine and tangent, are of the same number of degrees as the numeral in the left-hand margin. So, for example, if the single numeral 6 is incorporated in the left-hand margin beneath the multiplication and division prime numeral P, all angles to the right in the horizontal space of that numeral 6 are in the area of 6 degrees, unless the number of degrees shows a change when traversing the horizontal space. Thus, for example, two numerals 10/9 (see FIG. 3) indicate that all the sine angles of that horizontal space are 10°, and all the tangent angles are 9°, unless or until 11 and 10 degrees appear when traversing the adjacent horizontal space.

The following sample operations and problems will illustrate the structure and operation of the instant slide rule:

Logarithms of numbers

Referring now to FIG. 3, to find the log of 16328, it is first necessary to find this number on the card 34. This number is found by first referring to the prime figure P in the left-hand margin of the rule 34. Thus, the first two digits of the numeral of which it is desired to find the log, are 16, and these two digits appear in the left hand margin as the prime figure P. The succeeding numerals 328 are found by moving the runner 22 along the length of the scale adjacent to the prime figure 16 until it reaches the point indicating the digits 328. This may be found in FIG. 3 as indicated by the arrowhead of the line marked "log."

The first two digits of the log of this number are the two digits indicated in the right-hand column of the rule 34 which is adjacent to the horizontal space in which the prime figure 16 appeared in the left-hand column. Hence, the first two digits of the log of 16328, are 21. The last three digits of the log are found when the hairline marker of runner 22 is in alignment with the last three digits of the number 328. Then reading on the linear scale 16, the digits 2, 9, and interpolating and estimating for the last digit, 6. Hence, the log of 16328 is 21296. However, the characteristic of the number 16328 is 4. Therefore, the log of the number is 4.21296.

Natural trigonometric functions and the logarithms of these functions

Assuming now that it were desired to find the sine of 8°44'17" and its log, it is first necessary to find this angle on the sine scale of card 34. Referring now to FIG. 3, the location of this angle on the sine scale is found first by placing the horizontal space with the sine numeral 8 in the left-hand margin thereof and with 44'17" beneath the window 14 of the envelope 12. This is indicated in FIG. 3 by the arrowhead of the line marked "sin." By moving the runner in alignment with the angle, it will be determined that the sine function may be found on the multiplication and division scale directly above it, so that this function is found to be .15193, the two digits of this function appearing as the prime number 15 in the left hand marging of the scale of the horizontal space, and the following two digits 19 being found on the calibrated scale in the horizontal space, while the last digit 3 is estimated.

In order to find the log of the sine angle indicated, it is not necessary to make any further movements. The first two digits of the log are found by merely traversing laterally to the right-hand margin of the card 34 of the horizontal space in which the sine function was found and noting the digits 18. The last three digits are then found by referring to the hairline marker of the previously positioned runner 22. It will be noted that the hairline marker, when positioned above the linear scale 16, indicates that the last three digits are 165. Therefore the sine of the angle 8°44'17" is .15193 and the log is 9.18165−10.

If it is desired to find the tan of 9°42'43" and its log, the card 34 is moved beneath the window 14 until the tangent numeral 9 in the left-hand margin thereof is positioned beneath the window. The proper horizontal space adjacent to the numeral 9 must be found in order to indicate the required 42'43". This is indicated in FIG. 3 by the dot-dash line "tan." The angle is found on the tangent scale and is indicated in FIG. 3 of the drawings by the arrowhead of the line marked "tan." If the runner 22 is then moved with its hairline marker positioned over tan 9°42'43", the function of this angle may be found on the multiplication and division scale within the same horizontal space. This function is .17114.

In order that it not be confusing, it will be noted that although the prime of the numeral 16 appears in the left-hand margin of the desired horizontal space, it will also be noted that the prime numeral changed to the numeral 17 a short distance within the space and is identified therein by the prime numeral letter P. Hence, the function of the desired angle is .17114.

In order to find the log of this angle, it will be noted that the first two digits of the log appear in the right-hand margin of the indicated horizontal space and these first two digits are 23. The last three digits are found in the linear scale 16 as indicated by the previously positioned hairline marker of the runner 22 and are found to be 338. Therefore, the tan of 9°42'43" is .17114 and the log is 9.23338−10.

To find co-sines and co-tangents, it is merely necessary to obtain the complementary angles thereof. Secants and co-secants can be found by performing the simple reciprocal operation to be discussed hereinafter.

Reciprocals

To find the reciprocal of a number, position the indicator 20 so that its left-hand hairline marker 26 is lined up with the left-hand edge of the scales on card 34. This will automatically position its right-hand hairline marker 28 in alignment with the right-hand end of the scales on the card 34. Then set the hairline 32 of the runner 22 on the desired number appearing in the multiplication and division scale. Find the log of the number and subtract it from 99. Then move the card 34 within the envelope 12 so that the resulting log appears in the window 14. Indicators 20 and 22 are then moved as a unit to align the hairline marker 32 on runner 20 with either the right or left-hand marginal lines of the card 34. The answer may then be found under the hairline marker 26 or 28, as the case may be, of the indicator 20.

Since the co-secant, secant, and co-tangent are reciprocals of the sine, co-sine and tangent, respectively, any of the former can be found from the latter by the simple reciprocal operation explained above.

Roots and powers of numbers

By the addition of a double and triple linear scale positioned adjacent to the present linear scale 16, square and cube roots could be found directly. However, such a provision is unnecessary because of the simplicity of the procedure in the instant described structure. To find the roots and powers of numbers, it is only necessary first to find the log of the number. The log is then multiplied or divided by the power that is to be raised, or by the root to be extracted. After this is done, it is merely necessary to determine the anti-log. This is made simple because of the ease in finding the logs. For square and cube roots, division can be performed easily by observation. For more complicated roots and powers, multiplication and division may be accomplished on the rule itself.

Multiplication of numbers

To multiply 24752 by 35943, align the hairline markers 26 and 28 on the indicator 20 with their respective ends of the card 34, then set the hairline marker 32 of runner 22 on the number 24752. When the number 24752 is aligned in the window 14 of the envelope, it will be noted that the two digits in the right-hand margin result in the numeral 39. Then set the left hairline marker 26 of the indicator 20 on 35943 and it will be noted that the digits for this horizontal space in the right-hand of card 34 define the numeral 55. When moving the indicator 20 be certain that runner 22 moves with it as a unit so that they keep their same relative positions.

Add the two right-hand numbers 39 and 55, and they equal 94. If the right-hand hairline marker 28 is employed instead of the left-hand marker 26, the number 1 is added to the total. Therefore, in the step previously described, if the right hairline marker 28 were employed, the addition would be 39+55+1=95. The answer to five figures will be 88866 and is found in the horizontal space adjacent to the numeral 94 positioned in the right-hand margin of the card 34 and directly under the hairline 32 of runner 22. In the event the addition of right-hand marker numerals should total more than 100, for example, 118, only the last two digits are employed to find the correct horizontal space. Therefore, the horizontal space would be the one in alignment to the left of the numeral 18 in the right-hand margin of the card 34.

Division of numbers

To divide number 35943 by 24752, follow the following steps:

(1) With the outer hairlines 26 and 28 aligned with the marginal lines of card 34, set marker 32 of runner 22 on the numeral 24752 in the appropriate multiplication and division scale and it will be noted that the numeral in the right-hand column of the horizontal space is 39.

(2) Set the hairline marker 32 of runner 22 on the numeral 35943 in the multiplication and division scale, and it will be noted that the corresponding number in the right-hand margin of the horizontal space is 55. In making this setting, it must be sure that indicator 20 moves with runner 22 as a unit so that they retain their relative positions.

(3) Subtract the two numbers thus found in the right-hand margin (55−39=16).

(4) The resulting answer to five spaces will be 1.4521. This is found in the horizontal space adjacent to the numeral 16 in the right-hand margin of the card 34, and under the left hairline marker 26 of indicator 20. If it were found under the right hairline marker 28 of the indicator 20 an additional number 1 would have to be subtracted, and the answer would have been found in the horizontal scale to the left of the numeral 15 appearing in the right-hand margin of the card 34.

From what has been thus described, it will be clear that the division of scales along the length of a slidable card 34 wherein each one of these scales is capable of being positioned beneath a window, will enable the construction of a more accurate slide rule, since each one of the horizontal scales is merely a continuation of the previous horizontal scale and the next subsequent scale. The result is the ablity to read functions and numbers with greater accuracy than has heretofore been permissible.

Referring now to the embodiment in FIG. 4, it will be noted that the same slide rule functions may be carried out, except, however, that the scales normally placed on a rigid card 34 are now in the form of rolls 134 secured to rollers 136, the whole of this unit being housed in an envelope 112 having a window 114 and a linear scale 116. Rotation of the scales is facilitated by the knobs 138 provided on the ends of the rollers 136. In this manner the slide rule may be compactly arranged, permitting a greater extension of the horizontal scales, thereby resulting in greater accuracy of reading.

The operations previously noted are carried out in the instant embodiment in the same manner as mentioned with respect to the embodiment shown in FIGS. 1 and 2. Naturally, the provision of a runner and indicator will be the same as was disclosed in the prior embodiment.

Figure 7:
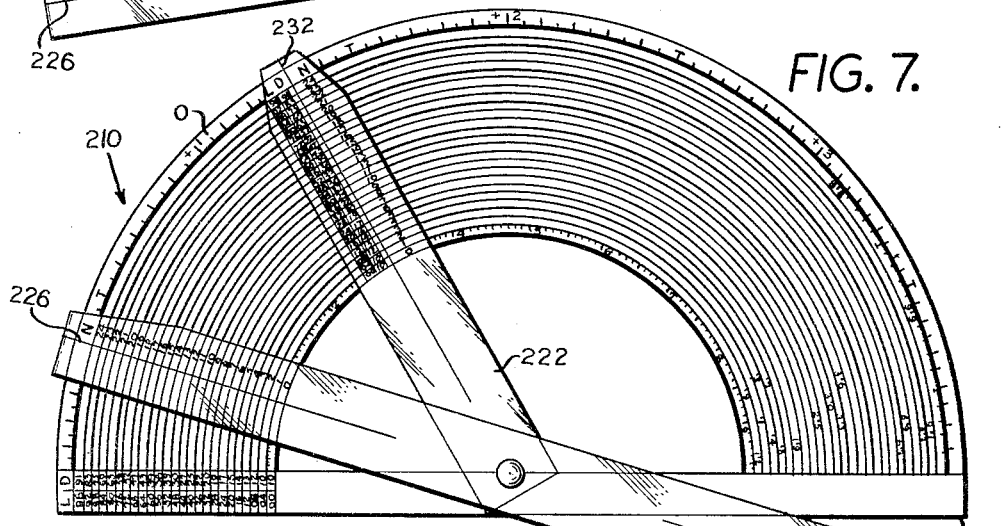
FIG. 7 is a plan view of the multiplication and division side of the rule in FIG. 6.
Figure 8:
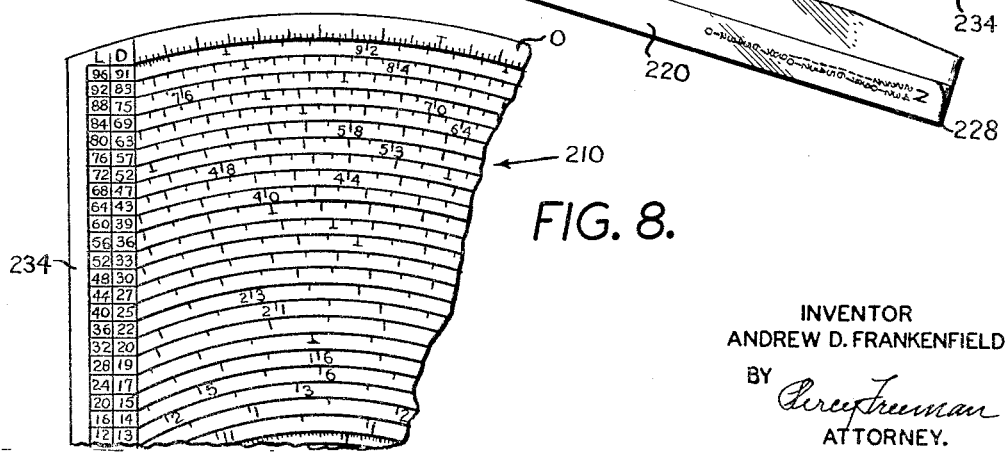
FIG. 8 is an enlargement of a portion of the side of the rule shown in FIG. 7.

The embodiment shown in FIGS. 6 to 8 is generally identified by the numeral 210. It differs from the prior described embodiments in that its card 234 comprises twenty-five parallel concentric semi-circular spaces. Each one of the twenty-five spaces is equivalent to four of the one hundred parallel spaces of the prior embodiment.

Column L on the card 234 corresponds to the column on the righthand edge of the sliding card rule in the previously described embodiments. It will be noted that instead of being divided one hundred times, column L is divided only twenty-five times, while its indicated numbering runs from 00, 04, 08, to 96. Further, it will be noted that each number shown in column L differs from the next number by a difference of four. Hence, each semicircular scale that is adjacent column L contains graduations that embody the difference between each of the members in the column. For the sake of clarity complete numbering of the semicircular scales has been omitted, but it will be recognized that the semicircle 96 contains calibrations up to the number 100.

Since column L represents the first two digits of a log, the numbers included in the scale adjacent thereto also represent the first two digits of a log. The last three digits of the log are found on the scale along the outer edge O. Therefore, the first two digits of the log change four times in traversing each of the concentric spaces of the rule 234.

The outer scale O is similar to the prior described scales 16 and 116, except, however, that because each semicircular scale contained on the card 234 is calibrated for four numbers, so also is the outer scale O. For example, outer scale O is divided into main divisions of +1, +2, +3. The +4 designation is not noted on scale O, but is found in column L. Each of the noted divisions is thus equivalent to the scales 16 and 116. Hence, scales 16 and 116 are repeated four times at the outer edge O of the card 234.

Card 234 is divided so that it may carry representations on its two sides. The side shown in FIG. 6 represents the sine and tangent, or trigonometric functions of an angle. The side shown in FIG. 7 represents the multiplication, division and log functions. Hence, in FIG. 6, the column noted ST represents the sine and tangent. The column L is the same as the column L in FIG. 7 and represents the log. The slash line in the column ST between two sets of numbers distinguishes the sine from the tangent. Column D on the multiplication and division side of card 234 facilitates multiplication and division.

All operations in the instant embodiment are performed exactly as described for the sliding card rule 34 previously described. The instant semicircular rule has two sliding indicators. The long indicator has a hairline on each side of the center pivot point. The hairlines are identified by the numerals 226 and 228. This indicator corresponds to the indicator 20 in the prior described embodiments and is here identified by the numeral 220. A short indicator 222 is provided with a hairline 232 that corresponds to the runner 22 previously described. The long indicator 220 shows an N scale on each of its ends adjacent to the hairlines 226 and 228. The short indicator or runner 222 also shows an N scale in addition to L and D scales that correspond to the L and D scales on the multiplication and division side of the card 234. The N scales are calibrated from 0 to 24. They serve to identify each of the twenty-five concentrically arranged semicircular scales and facilitate rapid identification of the desired scale.

Because this rule 234 has twenty-five spaces instead of the one hundred in the prior embodiment, when multiplying or dividing, the numerals noted in the columns N are added or subtracted in accordance with the use of the slide rule. Hence, if two numbers are to be multiplied, the number of the concentric scales within which each of these numbers is found is indicated in the N scale. The two numbers of the N scale are then added to each other. When so added, if their total is greater than the twenty-five concentric scales, twenty-five is subtracted from the total. The result is then the number on the N scale which indicates the concentric space within which the answer of the multiplication will appear.

So for example, if it were desired to multiply 24752 by 35943, runner 222 is so positioned along the semicircular space "22" as indicated in column D (FIG. 7) until the digits or calibrations 24 are reached. The runner 222 is then further positioned within the calibrations of scale 24 until its hairline marker 232 is positioned on the calibration 752. While this is being done, the hairlines 226 and 228 must be aligned with the edge or beginning portions of the scales noted on the card 234.

After finding the number 24752 and locating the marker 232 of runner 222 thereon, it will be noted that the desired number appears on line 9 of the N scale on runner 222. The indicator 220 is then pivoted until its hairline 228 is aligned with the numeral 35943 within semicircular space "33" on the D scale. This numeral appears on line 13 of column or scale N adjacent the hairline 228. The sum of the N lines nine and thirteen is twenty-two. When multiplying, if the righthand end 228 of the indicator 220 is employed, one is added to the sum of the lines thus resulting in a total of twenty-three lines. The answer, therefore, will appear within the twenty-third semicircular space of member 234. The answer is found by reading the number on the twenty-third line beneath hairline 232 of the runner 222.

It must be recognized that when the long indicator 220 is pivoted, it moves the runner 222 with it in fixed relationship. Hence, runner 222 will have been repositioned over the total of the multiplication of the numbers 24752 and 35943, found within the twenty-third space, the answer to five places being 88866.

To divide 35943 by 24752, follow the following steps:
(1) Set the hairline 232 of small indices 222 on the number 24752 within scale 9, while the hairlines 226 and 228 are alined with the calibrated edges of the card 234.

(2) Then move both arms 220 and 222 simultaneously so that hairline 232 is now lined up with number 35943.
(3) No. 35943 is found within the 13th semi-circular line on the card 234.
(4) Subtract N lines 9 from 13 to find the semi-circular space within which the answer of the division problem is to be found. The answer will be found on the 4th line of the rule 234 as indicated on the N scale.
(5) The answer is then the number that is read on the semi-circular scale within the 4th semi-circle aligned beneath the repositioned hairline 226. In actual use of the rule the answer will be found to be 1.4521.

The log of 16328 is found in the following manner:
(1) Find the first two digits "16" on the fixed scale "L."
(2) Move the indicator 222 along the semicircular space within which the "16" appears until its marker 232 is in line with the remaining digits 328 of the subdivisions of the "16" calibrations.
(3) The first two digits of the log 16328 are then found on the runner 222 within the column scale "L" thereon and that is positioned over the semi-circular scale wherein the number 16328 is found. That is to say, the space on the "L" scale of runner 222 that is in alignment with the semi-circular space within which the number 16328 appears will bear the first two digits of the log of the number.
(4) The first two digits of the log of the number 16328 found on the "L" scale of the runner 222 is read as "20." An additional digit "1" is added to the digits "20," resulting in the digits "21" because the runner 222 is positioned within the +1 scale of the outer scale O. Hence, the first two digits of the log of number 16328 are 21.
(5) The last three digits of the log of number 16328 are read on the +1 divisions of the O scale and are found to be 296. Therefore the log of 16328 is 21296.

The semi-circular rule has an advantage over a completely circular rule in that it fits very easily into an inside coat pocket. However, to those who are skilled in the art, it will be recognized that a circular rule will be exactly the same in detail as the semi-circular rule above described with perhaps the following exceptions:

By extending the semi-circular rule into a full circle, there may be then provided twice as much space between adjacent calibrations, thus permitting greater facility in reading the answer to at least five places with accuracy. Also, since the rule would form a complete circuit, there would be no marginal areas. Hence, all the reference data columns L, D, S, T and N would be printed on the two indicators 220 and 232. Where the circle of the calibrated spaces closes, there would be a line of demarcation. The scales would not be continuous at this point but would continue across the demarcation line onto the next higher or lower space as necessary to complete the problem.

It will be recognized from a comparison of FIGS. 6 and 7 that when using the trigonometric function side of the rule 234 as shown in FIG. 6, readings are made from the righthand side toward the lefthand side thereof, whereas, in carrying out simple arithmetical problems on the side as shown in FIG. 7, readings are made from the lefthand side across the scales toward the righthand side of the rule 234.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claim appended hereto.

I claim:

A slide rule comprising in combination a sheet, a plurality of concentric substantially semi-circular scale sections of a single continuous scale, disposed upon said sheet, said scale sections being equally and uniformly radially spaced apart and each terminating at each end along one of a pair of substantially opposite radii, an additional concentric scale, upon said sheet, bearing indicia of sub-divisions of each of said concentric scale sections, said sheet also having indicia along at least one of said opposite radii indicating the first two digits of the log in any particular concentric scale section, the last three digits of the log being observable on said additional concentric scale, and adjustable indicator means rotatably carried by said sheet having an axis of rotation concentric with all said scale sections for providing an indication between predetermined ones of said scale sections, said adjustable indicator means comprising a pair of arms supported for rotation about said axis, said arms being relatively adjustable for simultaneous rotation about said axis in a predetermined angular relationship with respect to each other, both of said arms extending radially outwardly from said axis of rotation.

References Cited in the file of this patent

UNITED STATES PATENTS

| | | |
|---|---|---|
| 775,667 | Zollman | Nov. 22, 1904 |
| 980,867 | Penn | Jan. 3, 1911 |
| 1,157,526 | Gilson | Oct. 19, 1915 |
| 1,426,829 | Flynn | Aug. 22, 1922 |
| 1,484,176 | Haimes | Feb. 19, 1924 |
| 1,599,904 | Lotzbeyer | Sept. 14, 1926 |
| 2,088,395 | Bayard | July 27, 1937 |
| 2,163,032 | Goldstein | June 20, 1939 |
| 2,185,202 | Kuhlman | Jan. 2, 1940 |
| 2,445,464 | Ailinger | July 20, 1948 |
| 2,479,286 | Wolfskill | Aug. 16, 1949 |
| 2,542,943 | Reiner | Feb. 20, 1951 |
| 2,564,227 | Pepper | Aug. 14, 1951 |